United States Patent
Ganter

(10) Patent No.: US 7,559,716 B2
(45) Date of Patent: Jul. 14, 2009

(54) CLAMPING LEVER WITH VERTICALLY ADJUSTABLE THRUST BEARING

(75) Inventor: Berhard Ganter, Furtwangen (DE)

(73) Assignee: Otto Ganter GmbH & Co. KG Normteilefabrik, Furtwangen (DE)

( * ) Notice: Subject to any disclaimer, the term of this patent is extended or adjusted under 35 U.S.C. 154(b) by 310 days.

(21) Appl. No.: 11/420,063

(22) Filed: May 24, 2006

(65) Prior Publication Data

US 2006/0273503 A1    Dec. 7, 2006

(30) Foreign Application Priority Data

May 25, 2005 (DE) .................. 10 2005 024 014

(51) Int. Cl.
*B25B 5/08* (2006.01)
(52) U.S. Cl. .................. 403/322.4; 269/229; 269/231
(58) Field of Classification Search .......... 403/322.1, 403/322.4; 269/32, 228, 229, 231
See application file for complete search history.

(56) References Cited

U.S. PATENT DOCUMENTS 2,408,560 A * 10/1946 Keehn .................. 269/232
2,901,279 A    8/1959 MacNaught et al.
3,709,088 A * 1/1973 Pitzer .................. 411/70
5,156,508 A   10/1992 Grisley
5,526,661 A * 6/1996 Lin .................. 70/233
5,556,222 A * 9/1996 Chen .................. 403/323
5,865,560 A * 2/1999 Mercat et al. .......... 403/322.4

FOREIGN PATENT DOCUMENTS

GB        1 218 428        1/1971

OTHER PUBLICATIONS

Carbiner, H., "Spannexzenter, Ausfuhrund und Anwendung", In: technica, No. 7, 18, 1969.
Krahn, U.A., "Konstruktionselemente fur den Vorichtungs-und Maschinenbau", Vogel Buchverlag, 1, 1990.

* cited by examiner

*Primary Examiner*—Michael P Ferguson
(74) *Attorney, Agent, or Firm*—Baker & Daniels LLP

(57) ABSTRACT

A clamping lever with a vertically adjustable thrust bearing for the execution of a clamping movement on a tensioning device, preferably on a tensioning device with an eccentric tension lever which is pivoted on a set bolt by means of a penetrating cross bolt, wherein a thrust bearing associated to a clamping contour of the clamping lever is constructed vertically adjustable. The cross bolt is held secure from torsion in a cross hole of the set bolt and the tension lever exhibits a pivoting angle limit to the set bolt.

15 Claims, 6 Drawing Sheets ically adjustable thrust bearing, whose cross hole does not wear out in the region of the tension lever and that the tension lever always exhibits a maximum clamping power.

CLAMPING LEVER WITH VERTICALLY ADJUSTABLE THRUST BEARING

BACKGROUND OF THE INVENTION

The subject matter of the invention is a clamping lever with a vertically adjustable thrust bearing, whose cross hole does not wear out in the region of the tension lever and that the tension lever always exhibits a maximum clamping power.

A clamping lever is used for various clamping tasks. One typical example is the construction of such a clamping lever as an eccentric tension lever; however the invention is not restricted to this example.

Such eccentric tension levers are used for clamping tasks in machine building; however they are also used for example for the securing of the hubs of bicycle wheels at the front wheel forks or rear stays of a bicycle.

When an eccentric tension lever is mentioned in the following invention description, attention is drawn again to the fact that the invention is not restricted to this. Instead of an eccentric clamping surface so-called spiral-shaped clamping surfaces can also be used.

In the case of the named clamping levers according to the state of the art the clamping lever should be brought from its most upright possible, slack position into a folded, taut position. The release position is namely characterized in particular in that the hand-operated lever is located in an upright pivotal position, while the taut position preferably should be characterized in such a way that the clamping lever is in a somewhat horizontal taut position. By means of these two end positions (release position and taut position) the best results are attained ergonomically.

However, the fact that it is not always possible for specified clamping tasks to bring the clamping lever in its taut position into its most favorable position (preferably horizontal position) is a disadvantage of the known clamping lever.

Thus when clamping position is mentioned, by that it is meant that the clamping lever is brought into its most favorable mechanical engineering pivotal movement, i.e. the clamping lever in the taut position should not be in the way, it should have the most favorable position ergonomically and in the embodiment as an eccentric, should achieve the greatest gripping power.

Up to now people have solved this problem by arranging a tapped hole in the region of the cross bolt which serves as a drag bearing for the clamping lever, wherein a clamp bolt engages in the cross bolt, said clamp bolt being constructed vertically adjustable with its threading in the region of the cross bolt.

Therewith the possibility existed that for securing of a specified taut position the clamping lever could first be twisted, in order in this way to bring the clamp bolt into a favorable taut position and then move the clamping lever in order to tighten it.

However, in the process it must be taken as part of the bargain that the taut position of the tension lever can be unfavorable for operation.

In another embodiment it is known to construct the tension bolt itself, which is used for tensioning between the surfaces to be tensioned and penetrates these surfaces, to be vertically adjustable.

By means of twisting this tension bolt constructed as a threaded bolt the taut position can hence be set also before moving the tension lever.

A third known embodiment provides a tension bolt for setting the tension height, said tension bolt penetrating both plates or elements to be tensioned with a through borehole and bearing a threading on its free lower end onto which a nut is screwed. Consequently by means of the adjustment of this nut the tension height can also be set.

The named embodiments suffer from the drawback that the tension height can only be adjusted if one gets hold of the underside of the threaded bolt and the threaded nut located there.

In the case of the other described embodiment, in which the threaded bolt penetrates the cross bolt of the tension lever and a vertical adjustment of the tension bearing is possible there, the disadvantage exists that a sensitive setting of the elevation of the tension bearing is not possible. This setting depends on the thread pitch of the tension bolt penetrating the cross bolt, which is associated with disadvantages. By means of appropriate twisting in the region of the thread pitch therefore an unfavorable, undesirable tension position can again be achieved.

In other respects due to the tapped hole penetrating the cross bolt the cross section of the cross bolt is weakened and as a result the entire clamping transfer is no longer secure.

In addition the aforementioned embodiments of a tensioning device exhibit the disadvantage that due to the pivoting of the pivoted lever with a bearing bolt the bore of the bearing in the pivoted lever wears itself out due to the swivel motion of the pivoted lever that has been executed multiple times, since the bearing bolt in the bore of the bearing executes a frictional effect.

SUMMARY OF THE INVENTION

Further it is important that the tension lever exhibits a pivoting angle limit.

For this purpose the inventive tension lever has forked ends on its interior, to be precise at the face of the forked end, an inclination opposite to the opposing head of an arranged set bolt.

This inclination exhibits a lower edge which upon reaching of the maximum swivel range of the tension lever strikes the outer surface of the set bolt.

With these features the advantage is obtained that the operator, upon attainment of the dead stop, i.e. when the tension lever is in its maximum swivel down position, thus has certainty that the maximum clamping power has also been achieved.

The invention is thus based on the object of further developing a clamping lever with vertically adjustable thrust bearing in such a way that the cross hole does not wear out in the region of the tension lever and that the tension lever always exhibits a maximum clamping power.

To solve the problem the invention is characterized by the fact that the cross bolt is held secure from torsion in a cross hole of the set bolt and that the tension lever exhibits a pivoting angle limit to the set bolt.

With the given technical teaching the significant advantage results that due to the torsion secured bearing bolt the bores of the bearing in the tension lever no longer wear themselves out.

Additionally, the fact that due to the inventive pivoting angle limit of the tension lever said tension lever attains the maximum clamping power in its swiveled down position is a significant advantage.

In addition, as a result of the vertical adjustment of the thrust bearing the advantage arises that one is now no longer dependent on the unfavorable thread pitch of the tension bolt, said tension bolt making only a rough setting of the elevation of the clamping lever possible.

Consequently, with the arrangement of a vertically adjustable thrust bearing for the clamping lever the advantage arises that one can make very sensitive settings, because in a preferred embodiment of the invention provision is made that a fine pitch thread is used for the vertical adjustment, said fine pitch thread making only a slight vertical adjustment backlash possible in the case of relatively great torsion.

In a preferred embodiment of the invention provision is made that the bearing bolt (cross bolt) is arranged in a torsion secure manner in the cross hole of the tension lever, by arranging said bearing bolt in the cross hole, for example like a kind of interference fit or via a provided deformation of the cross bolt if said cross bolt is arranged in the cross hole.

In addition to that provision is made that the tension lever exhibits a pivoting angle limit which guarantees that the tension lever exhibits its maximum clamping power when said tension lever has occupied its maximum swivel down position.

In addition provision is made that a lock nut is arranged freely pivoting on the clamping plate and that said lock nut exhibits an internal thread into which the external thread of a washer engages, said washer consequently being constructed vertically adjustable with reference to the lock nut.

The washer, which is held vertically adjustable in the lock nut 9, then forms the thrust bearing or the clamping surface for the clamping contour of the clamping lever.

This washer is in accordance with the invention now constructed vertically adjustable, because with its external thread it engages into an associated internal thread of the lock nut resting on the clamping plate.

However, in kinematic reversal of this embodiment provision can also be made that on the outer circumference of the lock nut an external thread is arranged and that on this external thread the washer which is somewhat c-shaped in cross section overlaps and engages into this external thread with an internal thread and is also held vertically adjustable there.

The subject matter of the present invention does not just arise from the subject matter of the individual patent claims, but rather also arises from the combination of the individual patent claims with one another.

All disclosed information and features in the documentation, including the abstract, in particular the spatial development represented in the drawings, are claimed as essential to the invention, provided they are novel compared to the state of the art, either individually or in combination.

BRIEF DESCRIPTION OF THE DRAWINGS

In the following the invention will be described in greater detail with the help of drawings showing several embodiments. In this connection additional features and advantages of the invention that are essential to the invention arise from the drawings and their description.

The figures show the following.

DETAILED DESCRIPTION

Figure 1:
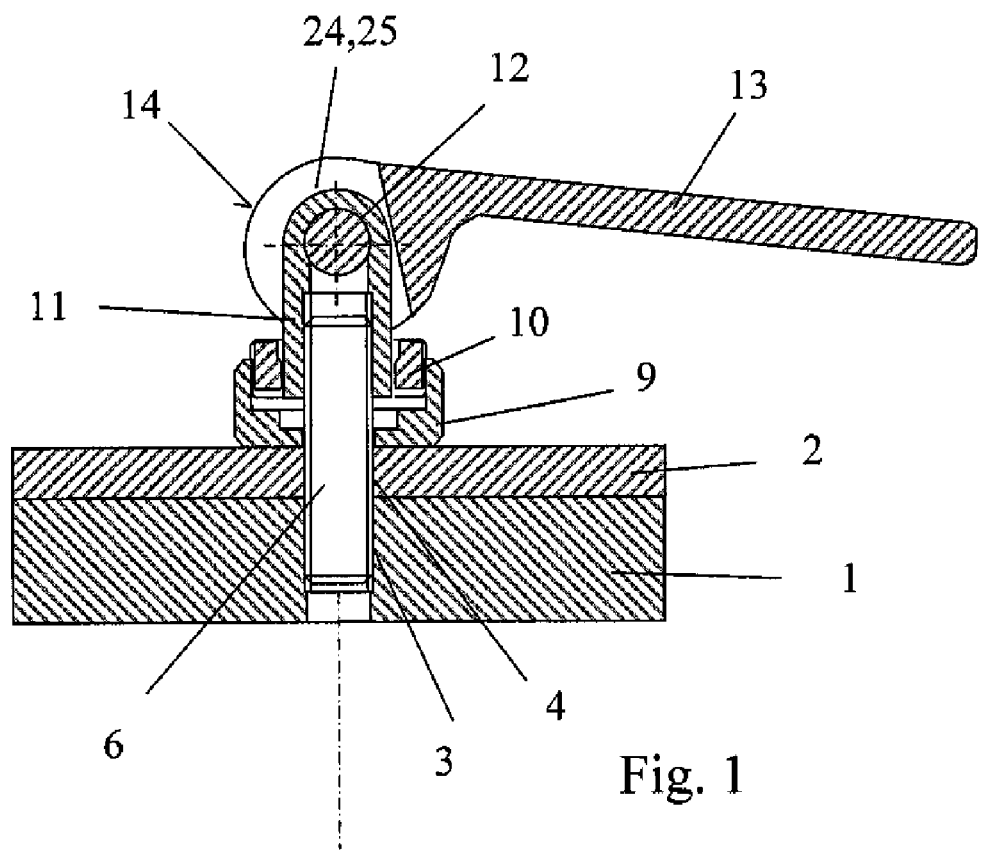
FIG. 1: a sectional view of a first reduction to practice of the invention in taut position.
Figure 2:
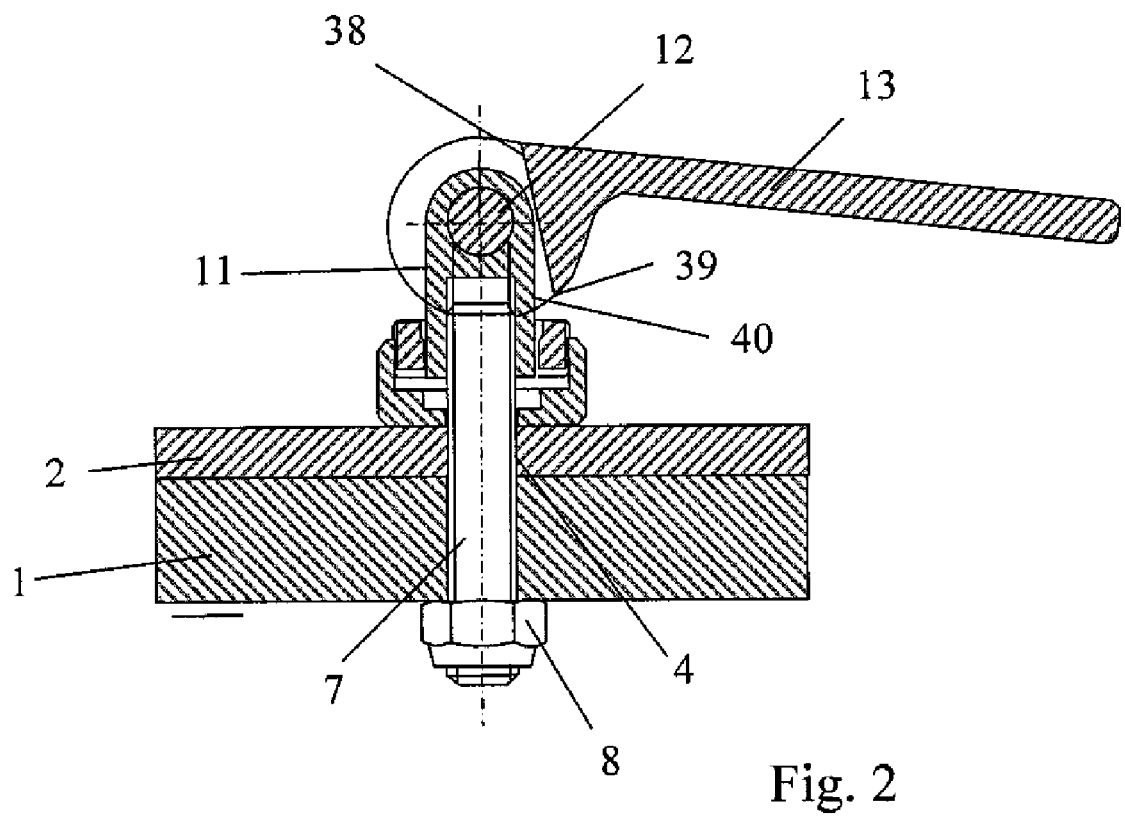
FIG. 2: a second embodiment in section.

FIGS. 1 and 2 fundamentally show that a clamping element in the form of a plate 2 is to be clamped on a base element in the form of a plate 1. In the embodiment in accordance with FIG. 1 in this connection a tapped hole 3 is arranged on a base element in the form of plate 1, into which tapped hole the threaded bolt 6 engages with an associated external thread. The threaded blot 6 overlaps in other respects the unprepared borehole 4 in the clamping element in the form of plate 2 with play.

The upper end of the threaded bolt 6 in this connection is screwed into the internal thread of a set bolt 11, said set bolt in its upper region bearing a cross hole 27 which is penetrated by a cross bolt 12. This cross bolt 12 forms the pivot bearing for the tension lever 13.

Additionally the tension lever 13 exhibits an inclination 38 engineered between the two legs of the tension lever 13.

The lower edge 39 at the inclination 38 strikes the outer surface of the set bolt 11 upon achieving the maximum swivel range of the tension lever 13, said surface being described in FIG. 2 as the stop face 40.

It is understood that the threaded bolt 6 can also be constructed in one piece with the set bolt 11.

Figure 7:
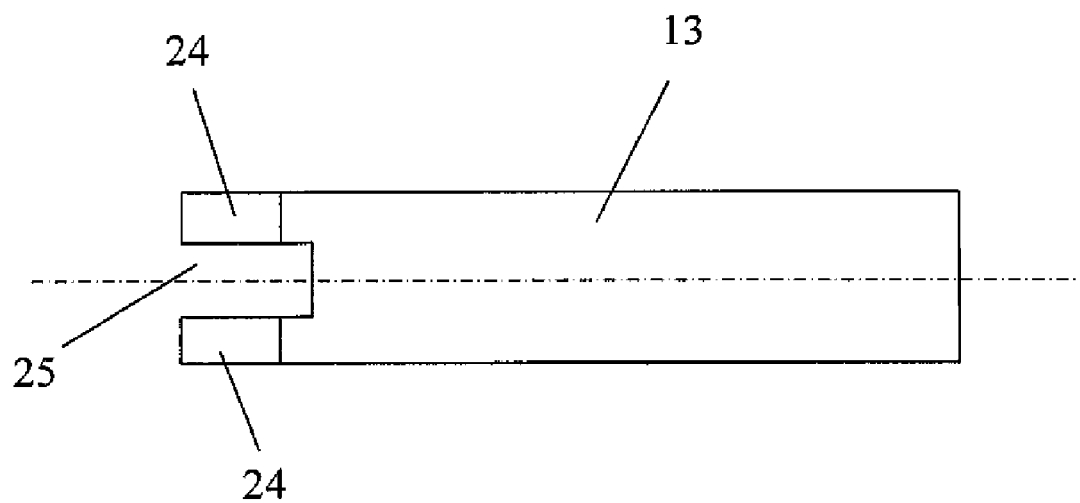
FIG. 7: the top view on the clamping lever.

In accordance with FIG. 7 the tension lever 13 encompasses with two clamping parts 24 the cross bolt 12 and forms a clamping contour 14 on its outer circumference.

In the shown embodiment this clamping contour is constructed as a spiral, i.e. the pitch of the clamping contour 14 is uniformly expanding over the entire pivoting angle of the tension lever 13 with reference to the axis of rotation.

In place of such a spiral clamping contour 14 an eccentric clamping surface can also be used.

Locking clamping surfaces can also be used, in which case in the region of the clamping contour 14 specific projections and knobs, grooves or the like are arranged.

In the embodiment in accordance with FIG. 1 the vertically adjustable clamp bearing for the tension lever 13 is formed by a lock nut 9 seated on the clamping plate 2, said lock nut 9 being freely pivoting about the axis of set bolt 11 and constructed of a washer 10 screwed in the internal thread of the lock nut 9, said washer 10 consequently being vertically adjustable with reference to lock nut 9.

FIG. 2 shows as a further embodiment an equally vertically adjustable clamp bearing, where however the connection to the base plate 1 is disengaged in a different way. Here, in place of the threaded bolt 6 a tension bolt 7 is provided, said tension bolt penetrating the boreholes in base plate 1 and clamping plate 2 which are unprepared and flush to one another and bearing a threading on its front free end, to which a nut 8 is screwed.

Instead of the nut 8 that is shown a screw head can also be provided.

Figure 3:
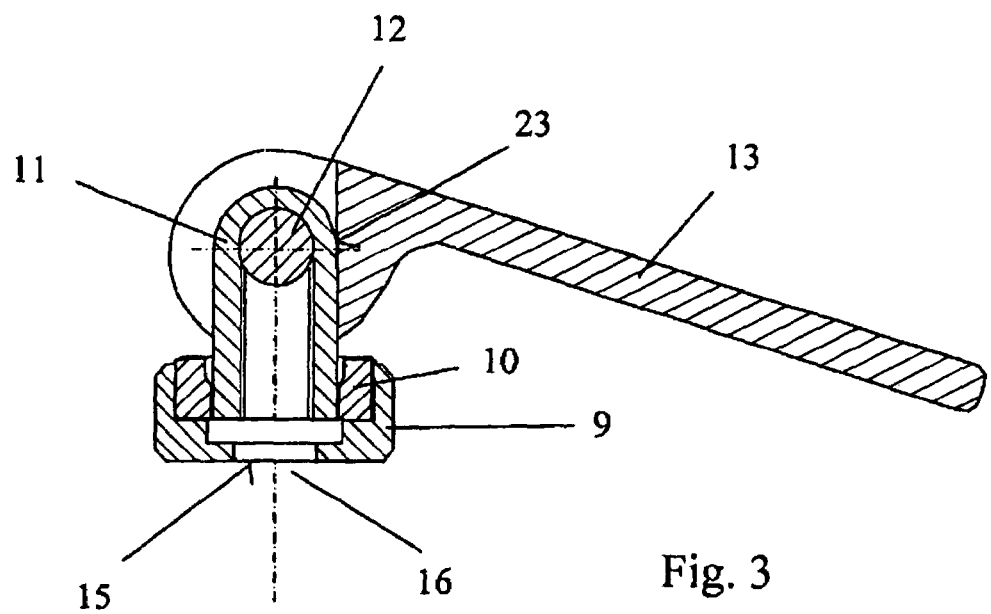
FIG. 3: an embodiment constructed in accordance with FIG. 2, however without representation of the threaded bolt or with internal thread.

FIG. 3 shows an embodiment similar to FIG. 1, where it can be recognized that the underside of the lock nut 9 is constructed as a clamping surface 15 with which said lock nut rests on the clamping plate 2.

Figure 4:
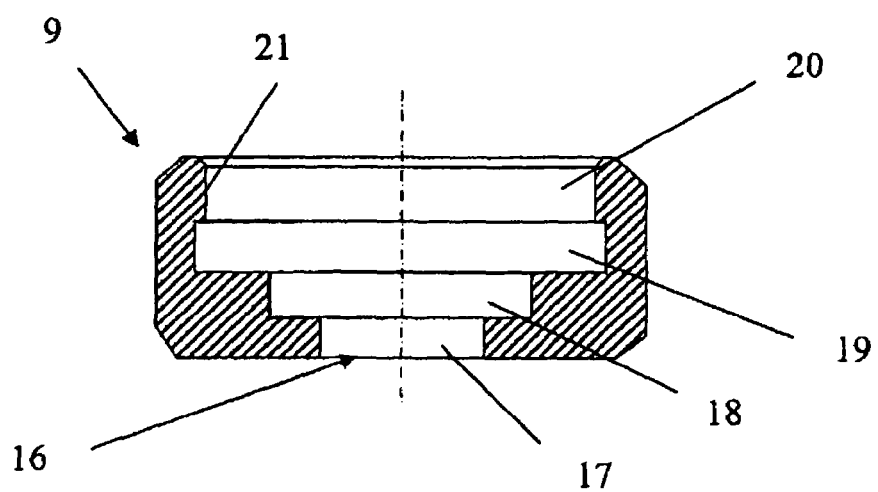
FIG. 4: the cross section through the lock nut.

It can also be recognized that in the region of the lock nut 9 a through hole 16 is present. The structure of this through hole 16 shown in greater detail in FIGS. 4 through 6.

The through hole 16 is formed by a total of four different bore diameters, namely a small diameter relative to the bore diameter 17, said small diameter transitioning to a bore diameter 18, which in turn transitions to a bore diameter 19 and said bore diameter transitioning to a bore diameter 20.

The bore diameter 19 serves only the purpose of release in the production of the internal thread 21 on the inner circumference of the bore diameter 20.

In mounted state the attachment 29 of the set bolt 11 then rests on the inner face of the bore diameter 18. The diameter of the attachment 29 in the set bolt 11 however extends over the entire length of the set bolt.

The bore diameter 17 corresponds to the inner diameter of the threaded bolt 6.

It is also possible to design the washer 10 in one piece with the lock nut (9) and of the same material in order to guarantee an additional torsion security and undetachability.

Figure 5:
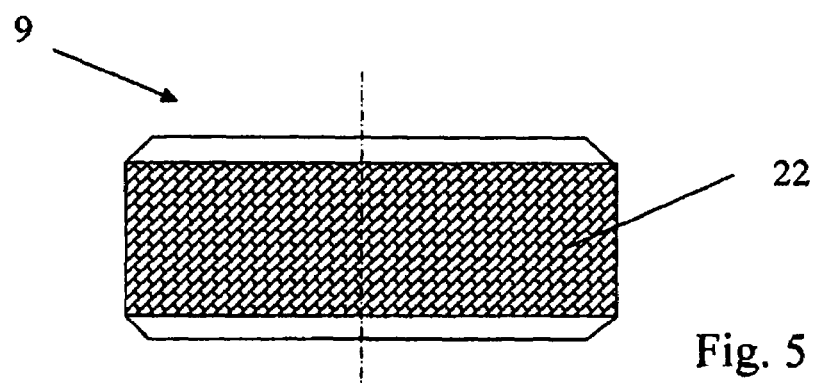
FIG. 5: the side view of the lock nut.
Figure 6:
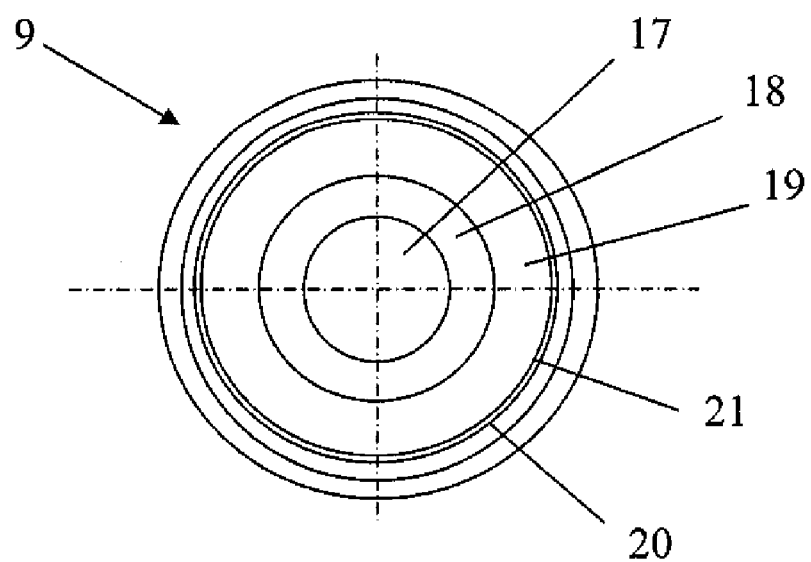
FIG. 6: the top view on the lock nut.

FIG. 5 also shows that the outer circumference of the lock nut 9 bears a knurled surface 22.

Instead of a knurled surface a wrench size can also be arranged, in order to guarantee an easy torsibility of the lock nut 9.

FIG. 7—as already mentioned above—shows a recess 25 between the two parallel arranged clamping parts 24, said recess which encompasses the set bolt 11.

Figure 8:
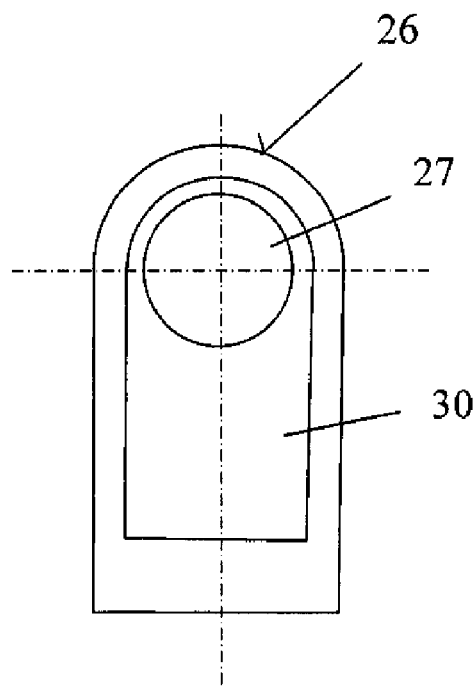
FIG. 8: the side view of the set bolt.
Figure 9:
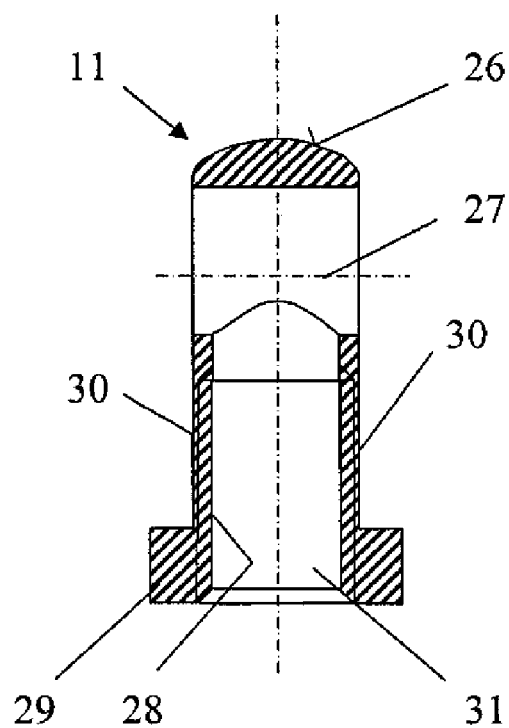
FIG. 9: the section through the set bolt.
Figure 10:
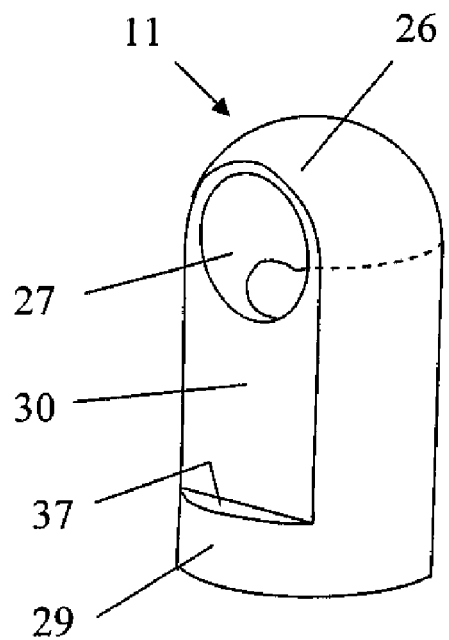
FIG. 10: the perspective side view of the set bolt.
Figure 11:
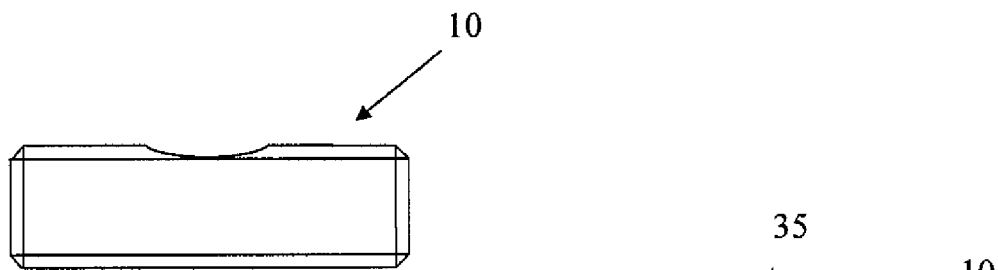
FIG. 11: the side view of the washer.

FIGS. 8 through 10 show the forming of the set bolt 11. Essentially the set bolt consists of a cylindrical bolt which on its underside bears the attachment, which extends with its diameter over the entire length of the set bolt 11 and bears the attachment 29 on the underside.

In the region on the other side of the attachment 29 in this connection however two lateral surfaces parallel to one another are arranged, which exhibit a smaller width than the attachment 29. Additionally, as a result it is ensured that the clamping contour 14 of the tension lever engages in the semicircular clamp surface 35 of the bearing surface 10 or is associated to it.

The purpose of this action is to have the set bolt penetrate in a torsion secure manner through an associated recess 32 adapted in forming into the washer 10 shown in FIGS. 11 through 14.

It is also important that an internal thread 28 is present in the longitudinal borehole of the set bolt 11, into which said thread for example the bolts 6, 7 are screwed.

It is understood that any torsion security between the set bolt 11 and the associated washer 10 can be used. For this reason any positive locking, detachable connection between the two parts 10, 11 can be used.

It is only important that the washer 10 can be moved freely along the axial length of the set bolt 11.

The upper face of the set bolt 11 is constructed as a circular part 26 in order in this way to penetrate through the recess 25 in the tension lever 13.

In the region of the swivel range of the tension lever 13 a stop face 23 is provided, said stop face serving the purpose of the pivoting angle limit of the tension lever 13. This is important in the execution of the clamping surface as eccentric, in order to restrict the lever sweep in the case of the highest gripping power.

This stop face 23 therewith stops on the outer diameter of the set bolt 11.

In the region of the attachment 29 in this connection a collar 37 is arranged, said collar serving the purpose of loss protection of the washer 10 on the set bolt 11.

Figure 12:
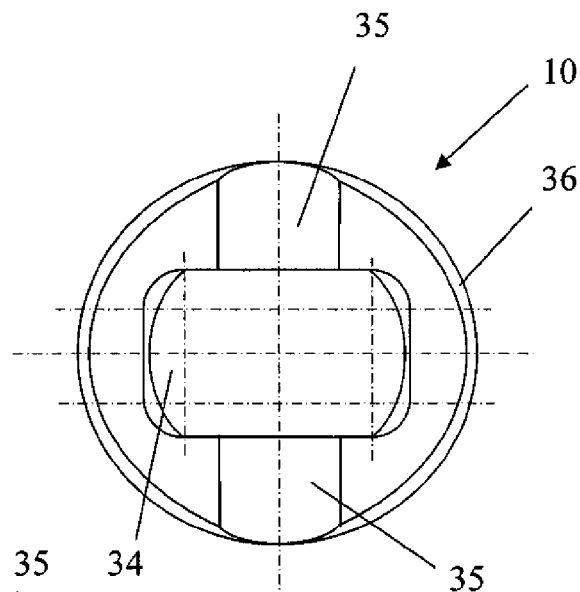
FIG. 12: the top view on the other washer.
Figure 13:
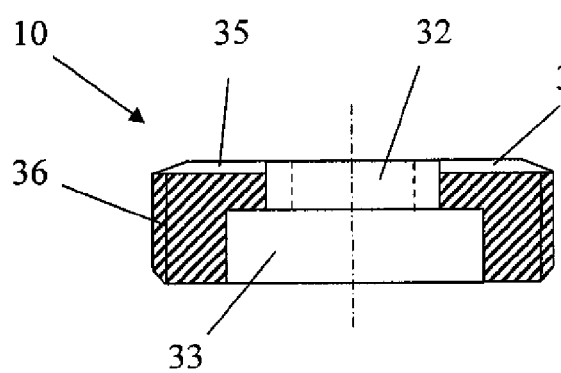
FIG. 13: section through the washer.
Figure 14:
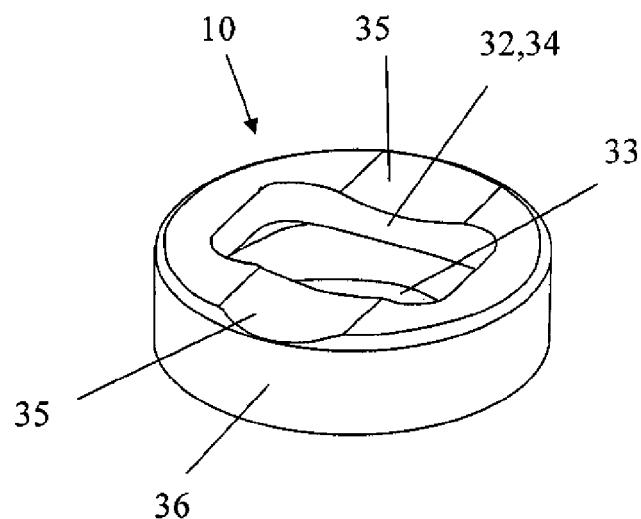
FIG. 14: perspective side view of the washer.

In this connection the set bolt penetrates the correspondingly controlled recess (see contour 34) of the washer in accordance with FIG. 12 and is held captive there.

In this connection the collar 37 engages in the underside of the recess 33. The controlled recess 32 for torsion security connects to this recess 33.

The lateral surfaces 30 thus penetrate through the associated contour 34 to the region of the recess 32 and the collar 37 joins to the inner face of the recess 33, in order in this way to guarantee a captivity of the vertical adjustment elements (washer 10) on the set bolt 11.

The outer circumference of the washer 10 in this connection exhibits an external thread 36, into which the washer 10 is screwed in the associated internal thread 21 in the region of the recess 20 in the lock nut 9.

Hence the washer 10 is constructed vertically adjustable with reference to lock nut 9.

Instead of said collar 37 for captivity other known features can also be used, such as for example a retainer ring, which also joins to the inner side of the washer 10 and secures said washer from dropping in an axial direction.

As a result a beautiful, closed tension element comes into being in which all parts are held captive.

The top side of the washer 10 in other respects exhibits two clamp surfaces 35 facing one another and flush with one another, being constructed as semicircular surfaces, for example. The clamping contour 14 of the tension lever 13 hence engages in these semicircular surfaces and results in tensioning there.

Preferably this top side of the clamp surface 35 is coated with a PTFE material in order to achieve the most low-friction clamping possible.

Of course other plastics can also be used, or a plastic disk can be placed on the surface as a whole.

FIGS. 15 through 18 show different taut positions and the advantages of the invention as a whole.

Figure 15:
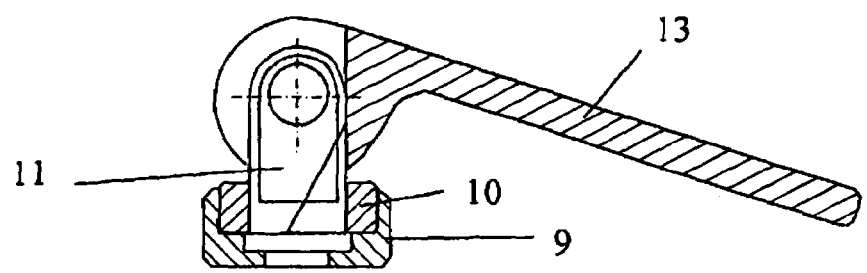
FIG. 15: a diagrammatic first representation of an embodiment with a minimum adjusted lock nut in the case of a tensioned clamping lever.

FIG. 15 shows that the tension lever 13 has already reached its maximum taut position, wherein the elevation adjustment bearing, formed of the vertically adjustable washer 10 is screwed into the lock nut 9 in its minimum position.

Figure 16:
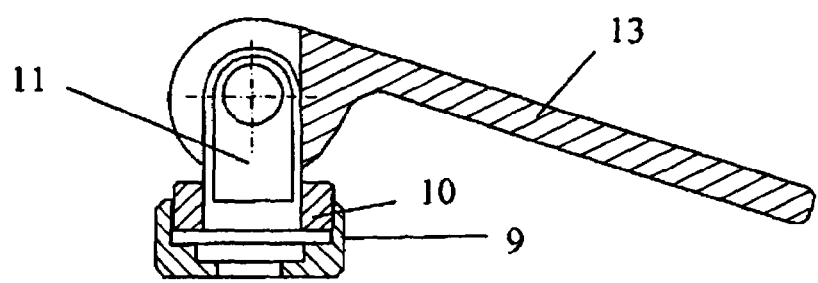
FIG. 16: the same representation as in FIG. 15, however with a maximum adjusted locknut.

FIG. 16 shows a different taut position in which it can be recognized that now the washer 10 is unscrewed from the lock nut 9 and in this connection the tension lever 13 is also taut.

Figure 17:
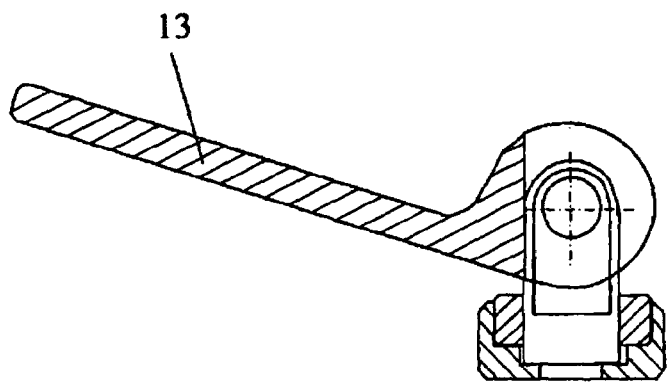
FIG. 17: the position of the clamping lever in accordance with FIG. 15 in slack state.
Figure 18:
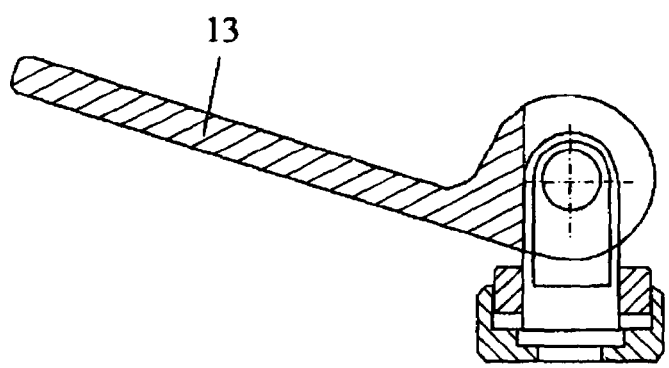
FIG. 18: the position of the clamping lever in accordance with FIG. 16 in slack state.

FIG. 17 shows the same representation as FIG. 15 with a slackened tension lever 13 and FIG. 18 shows the slackened position in accordance with FIG. 16.

From the comparison of these depictions in accordance with FIGS. 15 through 18 the essential advantage of the invention arises, namely that through simple twisting of the lock nut 9 it is now possible to achieve a vertically adjustable thrust bearing which is no longer arranged in the region of the cross bolt and which also no longer has to be held or adjusted to the underside of the base plate 1.

It is easily accessible, can be easily operated, by for example turning by hand or with a wrench, and it is in particular possible to make sensitive adjustments because preferably the internal thread 21 is constructed as a fine pitch thread.

The washer 10 can also be constructed as a plastic part.

Thus the protection against torsion (circumferential rotation) of the washer 10 on the set bolt 11 is important because it is now possible to hold the tension lever 13 in a untensioned position in accordance with FIGS. 17 and 18 and in this connection to put the lock nut 9 in an elevation adjustment position such that the washer 10 is joined in non-positive locking manner to the underside of the tension lever 13 which is still in the slackened position.

The tension lever 13 can be tensioned in the desired tension alignment as a result of which it is no longer necessary to additionally twist the tension lever.

This is the essential advantage of the invention, that a specified, desired pivoting position of the tension lever 13 (orientation position) can now always be retained because the required taut position can be produced by means of adjustment of the lock nut 9 with reference to the washer 10.

The relative motion between the lock nut 9 and the washer 10 is then accomplished with the tension lever 13 held in the hand. This is an especially simple action which has particular advantages compared to the conventional tensioning movements.

Consequently, regardless of the thickness of the plate 2 to be clamped the optimum taut position can always be produced in slackened state with a precisely aligned tension lever 13 in order to then tension this tension lever in precisely the previously set orientation position.

The invention claimed is:

1. A clamping lever assembly exerting a clamping force between a base element and a clamping element, the assembly comprising:
    a set bolt having a longitudinal axis, the set bolt comprising a body having a longitudinal bore and at least one lateral surface forming a non-circular cross-section extending along the exterior surface of the body and defining a retaining surface at one longitudinal end portion of the body, the set bolt comprising a cross hole at an opposite longitudinal end portion of the body;
    a clamping bolt fixed within the bore of the set bolt at one axial end portion of the clamping bolt, the clamping bolt extending through aligned through holes in the clamping element and the base element and axially restrained to the base element at an opposite axial end portion of the clamping bolt;
    an eccentric tension lever having an eccentric clamping contour comprising a pivot bore defining an axis of rotation;
    a cross bolt extending through the pivot bore of the tension lever and the cross hole of the set bolt and interconnecting the tension lever and set bolt, the tension lever being pivoted on the set bolt and limited in its pivoting angle relative to the set bolt;
    an axially adjustable thrust bearing comprising a lock nut comprising a through hole and one of an internal thread or an external thread and a washer comprising a through hole and the other of an external thread or an internal thread adjustably engaged with the thread of the lock nut, the washer being nested with and rotatably engaged with the lock nut and axially extending from the lock nut, the washer being non-rotatably, axially slidable on the at least one lateral surface of the set bolt, the lock nut and the washer being disposed about the clamping bolt between the tension lever and the clamping element such that the clamping contour of the tension lever engages a clamping surface of the washer and a clamping surface of the lock nut engages the clamping element, the tension lever being pivoted to apply an axial clamping force between the clamping element and the base element;
    wherein when the lock nut is rotated relative to the washer about the longitudinal axis of the set bolt, the washer slides along the at least one lateral surface of the set bolt to adjust the axial distance which the washer extends from the lock nut, adjusting the axial distance between the clamping surface of the washer and the clamping surface of the lock nut, adjusting the axial clamping force between the clamping element and the base element.

2. The clamping lever assembly according to claim 1, wherein the set bolt has a cylindrical form which extends over the entire length of the set bolt and said at least one lateral surface exhibits a smaller diameter than the retaining surface.

3. The clamping lever assembly according to claim 1, wherein the lock nut includes an internal thread which engages into an associated external thread of the washer and consequently is held vertically adjustable with reference to the washer.

4. The clamping lever assembly according to claim 3, wherein the external thread and the internal thread are constructed as associated fine pitch threads and exhibit a sensitive adjustment of the vertically adjustable thrust bearing.

5. The clamping lever assembly according to claim 1, wherein the base element includes a tapped hole in which an associated external thread of the clamping bolt engages and the clamping bolt extends through penetrates an unprepared borehole in the clamping element with play.

6. The clamping lever assembly according to claim 1, wherein the base element and the clamping element include unprepared boreholes which are flush to one another, said boreholes being penetrated by the clamping bolt, wherein the clamping bolt includes a threading on the opposite axial end portion, said threading being screwed into a nut.

7. The clamping lever assembly according to claim 1, wherein an upper end of the clamping bolt engages in an associated internal thread of the set bolt.

8. The clamping lever assembly according to claim 1, wherein the tension lever includes two clamping parts which encompass the cross bolt and form the clamping contour with an eccentric clamping surface.

9. The clamping lever assembly according to claim 1, wherein the clamping contour is constructed as a spiral, wherein the pitch of the clamping contour is uniformly expanding over the entire pivoting angle of the tension lever with reference to its axis of rotation.

10. The clamping lever assembly according to claim 1, wherein the through hole of the lock nut is formed with at least four different bore diameters, wherein one of the bore diameters includes the internal thread engaged with the washer.

11. The clamping lever assembly according to claim 1, wherein the lock nut is formed of the same material as the washer and which exhibits torsion security.

12. The clamping lever assembly according to claim 1, wherein the set bolt exhibits an internal thread arranged the longitudinal bore, said internal thread being constructed for accommodation of the clamping bolt and an upper face of the set bolt is constructed as a circular part which penetrates through a recess in the tension lever.

13. The clamping lever assembly according to claim 1, wherein the tension lever includes a stop face to the pivoting angle limit of the tension lever in the region of a swivel range, said stop face stopping on the exterior surface of the set bolt.

14. The clamping lever assembly according to claim 1, wherein the retaining surface of the set bolt comprises a collar or a retainer ring which is constructed for loss protection of the washer on the set bolt.

15. The clamping lever assembly according to claim 1, wherein the washer has on its upper side two clamp surfaces facing one another and flush with one another constructed as semicircular surfaces in which the clamping contour of the tension lever engages, wherein the clamp surfaces are constructed with plastic coating for low-friction clamping.

* * * * *